April 15, 1958  E. W. HAWKINSON  2,830,321
MOLD FOR RETREADING TRACTOR TIRES
Filed Sept. 12, 1955  3 Sheets-Sheet 2
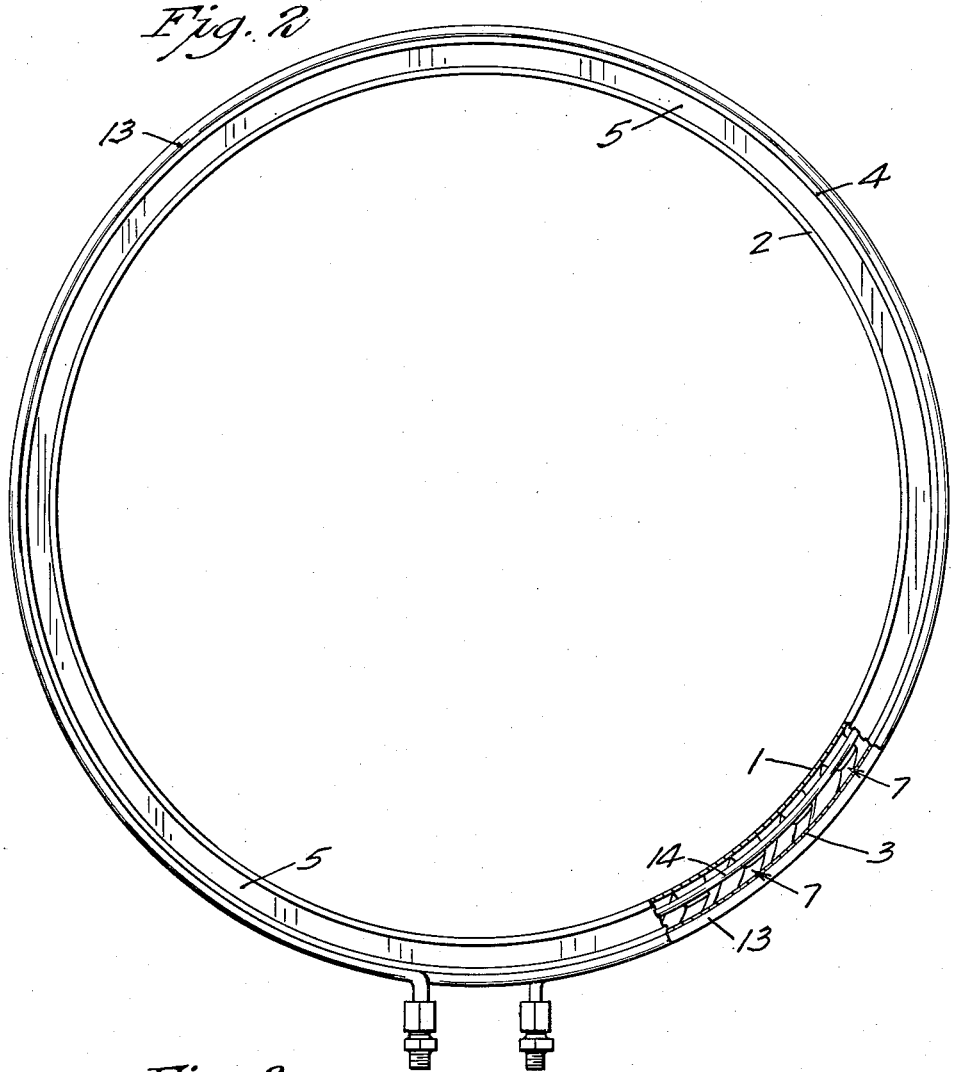
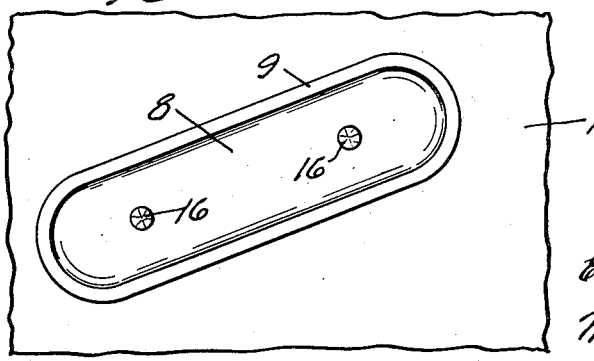
INVENTOR.
Earle W. Hawkinson
BY
Merchant & Merchant
ATTORNEYS April 15, 1958   E. W. HAWKINSON   2,830,321
MOLD FOR RETREADING TRACTOR TIRES
Filed Sept. 12, 1955   3 Sheets-Sheet 3
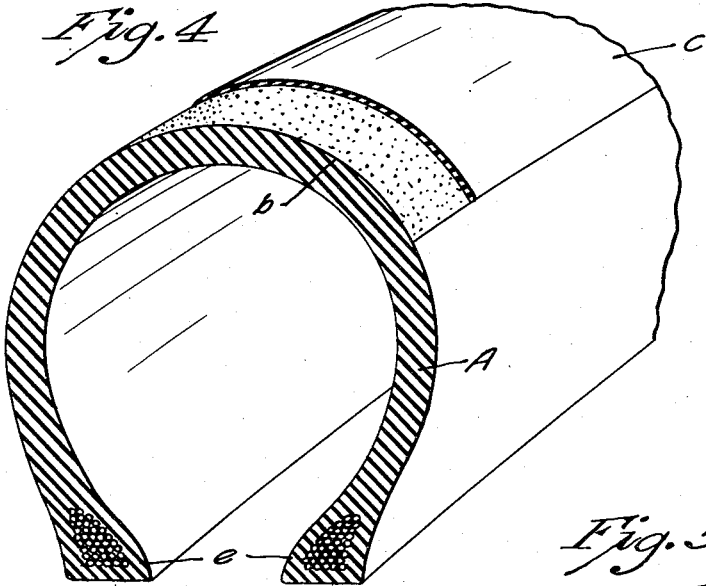
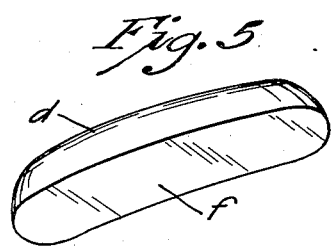
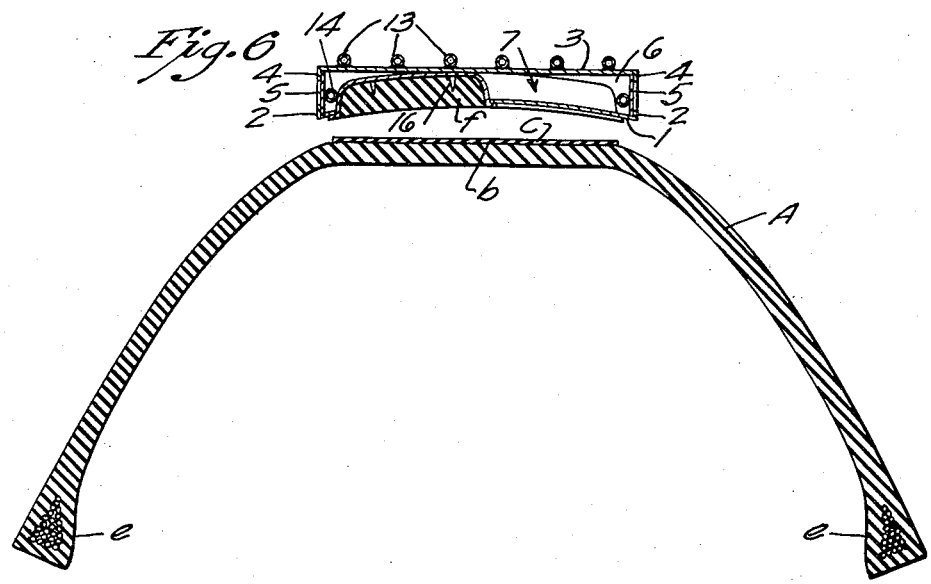
INVENTOR.
Earle W. Hawkinson
BY
Merchant & Merchant
ATTORNEYS

United States Patent Office 2,830,321
Patented Apr. 15, 1958

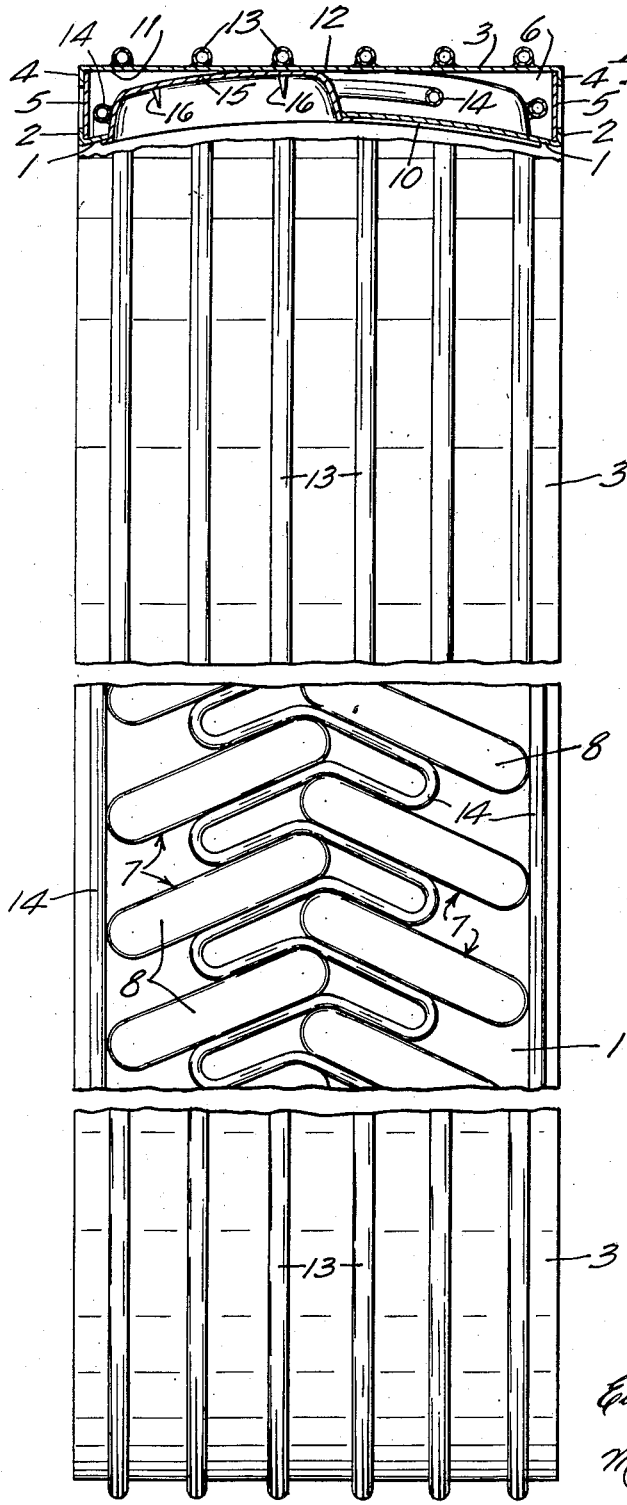

2,830,321
MOLD FOR RETREADING TRACTOR TIRES

Earle W. Hawkinson, Minneapolis, Minn., assignor to Paul E. Hawkinson Company, Minneapolis, Minn., a corporation of Minnesota Application September 12, 1955, Serial No. 533,750

5 Claims. (Cl. 18—18)

My invention relates generally to the renewing of worn treads of pneumatic tire casings, and more particularly to improvements in matrices for the application of lug-type treads to worn tire casings.

More particularly, my invention relates to improvements in Hawkinson-type retreading matrices, that is, unbroken band-like curing rings of less diameter than the diameter of the tire casing to be cured therein whereby tires may be entered thereinto and removed therefrom only by the lateral spreading of the beads of the tire to reduce the circumference of the same.

A still further object of my invention is the provision of a retread mold whereby a lug-type tread may be applied to a worn pneumatic tire casing with a minimum amount of new rubber. To this end but a thin layer of new rubber is applied to the worn casing intermediate the lugs while the new lugs of any desired depth are applied.

The above and still further objects of my invention will become apparent from the following detailed specification, appended claims, and attached drawings:

Referring to the drawings, wherein like parts are indicated by like characters throughout the several views:

Fig. 1 is a view partly in vertical section and partly in front elevation of a retread mold built in accordance with my invention, some parts being broken away;

Fig. 2 is a view in side elevation of the structure of Fig. 1, some parts being broken away and some parts shown in section; and Fig. 3 is a view in top plan of one of the lug forming cups utilized in my novel mold;

Fig. 4 is a fragmentary perspective view of a tire casing illustrating one of the steps of my novel invention;

Fig. 5 is a perspective view of one of the uncured tread lugs utilized in the practice of my novel invention; and Fig. 6 is a sectional view of a tire casing showing a method of entering same into and removing same from the retreading matrix of Figs. 1 and 2.

Referring with greater particularity to the drawings, the numeral 1 indicates the endless inner ring of my novel matrix. Ring 1 is preferably formed from sheet metal or the like, is slightly arcuate in cross section and has marginal flanges 2 which project angularly radially outwardly therefrom. Flanges 2 are continuous. Outer ring 3, also preferably formed from sheet metal and having a cylindrical shape, is radially outwardly spaced from and concentric with the inner ring 1. Ring 3 has its marginal edges bent angularly radially inwardly to provide continuous flanges 4. A pair of annular end plates 5 have their radially inner and outer edges overlapped by and rigidly secured to the radially opposed flanges 2 and 4, whereby to provide with the inner and outer rings 1 and 3 an annular chamber 6.

As shown, the inner ring 1 is provided with a plurality of circumferentially spaced openings 7, into each of which is nestingly received a tread-lug forming cup 8. As shown, the tread-lug cups 8 are provided with continuous marginal flange portions 9 which overlie portions of the radially inner surface 10 of the ring 1 adjacent their cooperating opening 7. The flange portions 9 of the cups 8 are rigidly secured as by welding to the inner ring 1. Cups 8 preferably, and as shown in Fig 1, have a depth which enables at least a portion thereof to engage the radially inner surface 11 of the outer ring 3. This arrangement assures a minimum loss of heat imparted to the radially outer surface 12 of the outer ring 3 through the medium of a heating coil or the like 13 wound spirally thereabout and secured thereto by solder or the like. Also as shown in Fig 1, additional heat may be imparted to the cups 8 and to the inner ring 1 by spirally winding a continuous steam conduit 14 through the chamber 6 intermediate the cups 8.

As shown in Figs. 1 and 3, the bottoms 15 of the cups 8 are provided with one or more pins 16 for retaining lug elements within the cups 8 during part of the tread-applying operation.

In practicing my novel method with the structure of Figs. 1 to 3, inclusive, a worn tire casing A, prepared by buffing the road-engaging crown surface $b$ while the casing A is rotated under inflation, is utilized. To the abraded surface $b$ is applied in a conventional manner a relatively thin layer of uncured tread stock $c$.

The next step in my novel method comprises forcing of uncured tread lugs $d$, calendered to substantially the shape of the cups 8, into the cups so as to cause the pins 16 to penetrate same sufficiently to retain same therewithin. At this point the tire casing A, as shown in Fig. 6, is reduced in circumference sufficiently by spreading the bead portions $e$ thereof laterally whereby same may be entered into the inner ring 1 while the uncured lugs $d$ are retained within the cups 8 by the pins 16. Thereafter the beads $e$ of the tire casing A are permitted to come together whereby the casing A expands radially outwardly into engagement of the thin uncured tread strip $c$ on the worn and abraded crown surface $b$, into engagement with the flat undersurface $f$ of the lugs $d$. Finally, internal expanding pressure is applied to the casing A and heat is caused to be circulated through the conduits 13 and/or 14 whereby to permanently vulcanize together the lugs $d$, the thin layer of tread stock $c$ and the worn and abraded crown surface $b$ of the tire A.

With the above-described apparatus and method it will be noted that a maximum of rubber may be placed where needed, to-wit in the lugs, whereas but a minimum of rubber is applied to the surface $b$ intermediate the lugs— thus effecting a substantial saving over previous methods wherein considerable rubber was wasted by applying same in positions where it would not come into contact with the ground over which the tire passed.

My invention has been thoroughly tested and found to be completely satisfactory for the accomplishment of the above objects, and while I have disclosed a preferred embodiment thereof, it should be obvious that same is capable of modification without departure from the scope of the appended claims.

What I claim is:

1. A tire retreading device for applying a lug-type tread to a tire casing, said device comprising endless annular substantially concentric inner and outer radially spaced ring members, said inner ring member having a plurality of circumferentially spaced openings therethrough, means joining adjacent side edge portions of said inner and outer ring members to enclose the space therebetween and to define an annular chamber, a tread lug forming cup received within each of the openings in said inner ring member for retaining lug forming elements therein, said cups defining radially inwardly opening recesses projecting radially outwardly from said inner ring member into said annual chamber, and means for supplying a heat media into said annular chamber.

2. The structure as set forth in claim 1, wherein each of said cups have marginal flanges which overlie portions of said inner ring member adjacent each respective cooperating opening for rigidly securing the cups to the inner ring member with the radial outer portion of each cup being in engagement with the inner surface of the outer ring member.

3. The structure as set forth in claim 1 wherein said ring members are each formed of sheet metal with said inner ring member being axially arcuate and said outer ring member being axially cylindrical in cross-section.

4. The structure as set forth in claim 1, wherein said cups are each provided with radially inwardly projecting pin means for retaining a lug forming element therein.

5. The structure as set forth in claim 1 wherein said means comprises a steam conduit wound serpentinely through said annular chamber intermediate the cups and in further combination with other heat means secured to the radial outer peripheral surface of said outer ring member.

References Cited in the file of this patent

UNITED STATES PATENTS

| | | |
|---|---|---|
| 2,591,934 | Hawkinson | Apr. 8, 1952 |
| 2,659,933 | Hawkinson | Nov. 24, 1953 |
| 2,662,245 | Hawkinson | Dec. 15, 1953 |
| 2,697,472 | Hawkinson | Dec. 21, 1954 |